(12) United States Patent
Billick et al.

(10) Patent No.: US 7,370,238 B2
(45) Date of Patent: May 6, 2008

(54) SYSTEM, METHOD AND SOFTWARE FOR ISOLATING DUAL-CHANNEL MEMORY DURING DIAGNOSTICS

(75) Inventors: Stephen J. Billick, Austin, TX (US); Saurabh Kumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 480 days.

(21) Appl. No.: 10/699,305

(22) Filed: Oct. 31, 2003

(65) Prior Publication Data
US 2005/0102568 A1   May 12, 2005

(51) Int. Cl.
   *G06F 11/00* (2006.01)
(52) U.S. Cl. ............................................. 714/36; 713/2
(58) Field of Classification Search .................. 714/36
   See application file for complete search history.

(56) References Cited

U.S. PATENT DOCUMENTS

| | | | | |
|---|---|---|---|---|
| 5,119,486 | A | | 6/1992 | Albonesi .................... 395/425 |
| 5,848,018 | A | * | 12/1998 | McClure .................... 365/201 |
| 6,055,653 | A | * | 4/2000 | LeBlanc et al. ............ 714/718 |
| 6,408,334 | B1 | * | 6/2002 | Bassman et al. ........... 709/223 |
| 6,421,798 | B1 | * | 7/2002 | Lin et al. .................... 714/718 |
| 6,762,615 | B2 | * | 7/2004 | Lee et al. .................... 324/765 |
| 6,766,474 | B2 | * | 7/2004 | Schelling .................... 714/36 |
| 6,792,561 | B1 | * | 9/2004 | Mamata ....................... 714/36 |
| 6,862,695 | B2 | * | 3/2005 | Lin ............................. 714/36 |
| 6,971,049 | B2 | * | 11/2005 | Bakke et al. ................ 714/44 |
| 7,000,159 | B2 | * | 2/2006 | Stern et al. ................. 714/718 |
| 2002/0010891 | A1 | * | 1/2002 | Klein .......................... 714/767 |
| 2004/0158701 | A1 | * | 8/2004 | Merkin ........................ 713/2 |
| 2004/0199830 | A1 | * | 10/2004 | Gilbert et al. ............... 714/47 |
| 2005/0257109 | A1 | * | 11/2005 | Averbuj et al. ............. 714/733 |

OTHER PUBLICATIONS

Rambus, Rambus RDRAM Overview, [retrieved on Jun. 2, 2006], Retrieved from the Internet: <URL: http//web.archive.org/web/20030201092035/http://www.rambus.com/products/rdram/>.*
ASUS TR-DLS Dual Socket 370 Motherboard User's Manual, Nov. 2001, ASUSTek Computer Inc., p. 67.*
AWARDBIOS 6.0 User Guide, Award Software International Inc., 1999, pp. 48-54.*

\* cited by examiner

*Primary Examiner*—Scott Baderman
*Assistant Examiner*—Paul F Contino
(74) *Attorney, Agent, or Firm*—Baker Botts L.L.P.

(57) ABSTRACT

A system, method and software for isolating information handling system memory system devices are disclosed. In dual-channel double-data-rate memory system implementations, teachings of the present disclosure facilitate accurate identification of memory system devices that fail diagnostic testing or cause memory errors. A BIOS level application is provided which permits user or application selection and isolation of memory system devices or components, thereby eliminating the need for physical removal of such components during testing as well as permitting continued use of the information handling system with defective memory system devices isolated.

23 Claims, 4 Drawing Sheets

SYSTEM, METHOD AND SOFTWARE FOR ISOLATING DUAL-CHANNEL MEMORY DURING DIAGNOSTICS

TECHNICAL FIELD

The present disclosure relates generally to information handling systems and, more particularly, to diagnostic testing of complex information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the increase in complexity reflected in current information handling system designs has come a corresponding increase in difficulty in diagnosing error messages when the information handling system fails. One area of particular complexity flows from advances in information handling system memory systems and their corresponding devices. One such advance is information handling system support for dual-channel double data rate (DDR) memory.

In one aspect, dual-channel DDR memory generally involves concurrent operation of at least two memory controllers. For every clock cycle, there are preferably two reads executed into the memory. In addition, dual-channel DDR memory systems typically simultaneously employ at least two memory cards or memory sticks. The simultaneous use of multiple devices in dual-channel DDR memory systems in particular, creates significant problems in diagnosing information handling system memory errors.

In operation, many conventional memory software diagnostics typically point to a suspected faulty address location when attempting to ascertain reasons for memory failures. With a dual-channel memory system, identifying precisely which dual-inline-memory-module (DIMM) is at fault or failing using such diagnostic routine is often impossible. The diagnostic problem is further exacerbated in information handling systems employing as many as four (4) DIMMs.

Alternate methods for identifying failing DIMMs in a dual-channel memory system typically involve the expenditure of man hours iteratively disassembling the computer system and alternating the DIMMs included in the information handling system throughout repeated boots. In addition to the resources wasted through such iterative remove and reboot diagnosis routines, computer manufacturers dispatching replacement parts for such systems will frequently need to dispatch entire sets of replacement parts instead of sending replacement parts for only those parts legitimately suspected as defective or faulty. In many instances, if a customer calls an information handling system service center with a memory problem, a dispatch of multiple DIMMs must typically be sent to fix the problem when in fact only one DIMM is defective or faulty. Such scenarios create additional costs and expenses for information handling system servicers or providers in the form of dispatching multiple DIMMs first, and second in the form of later information handling system providers testing of those DIMMs received from the customer to identify those DIMMs which are indeed defective and those which are still operational.

SUMMARY

In accordance with teachings of the present disclosure, software embodied in computer readable media for diagnosing a memory system including a plurality of memory system devices is provided. In a preferred embodiment, the software is preferably operable to select at least one memory system device for isolation, facilitate isolation of the at least one selected memory device and perform at least one diagnostic test on the isolated device.

Also in accordance with teachings of the present disclosure, software embodied in a computer readable media for managing a memory system having a plurality of memory system devices is provided. In a preferred embodiment, the software when executed is preferably operable to receive an operating state selection for a selected information handling system memory system device and alter a current memory system device operating state in accordance with the operating state selection.

In a further aspect and in accordance with teachings of the present disclosure, an information handling system including a plurality of memory slots operable in at least one of a plurality of operating states, at least one processor and a program of instructions executable by the processor is provided. In a preferred embodiment, the program of instructions is preferably operable to effect a selected operating state for at least one of the plurality of memory slots.

In still another aspect and in accordance with teachings of the present disclosure, a method for identifying faulty devices in a memory system including a plurality of memory slots and a plurality of memory modules disposed in at least a portion of the plurality of memory slots is provided. In a preferred embodiment, the memory slots are controllable from a basic input-output system (BIOS) utility. The method preferably performs at least the operations of isolating, via a BIOS utility setting, a memory system device and performing at least one diagnostic test on the isolated memory system device, the diagnostic test operable to produce at least one result.

In one aspect, teachings of the present disclosure provide the technical advantage of a means by which an individual may disable selected DIMMs in a dual-channel memory system without requiring that individual perform any disassembly of the information handling system.

In another aspect, teachings of the present disclosure provide the technical advantage of enabling isolation down to an exact DIMM in a dual-channel DDR information handling system memory system, that DIMM deemed most likely the cause of information handling system memory errors.

In a further aspect, teachings of the present disclosure provide the technical advantage of allowing a user to continue substantially normal use of their information handling system by isolating a defective DIMM until a replacement DIMM is received.

In still a further aspect, teachings of the present disclosure provide the technical advantage of a diagnostic routine capable of testing one or more components in a memory system of an information handling system employing dual-channel DDR memory devices or components and where such a diagnostic system itself is preferably operable to selectively disable and enable one or more of the memory system devices or components.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
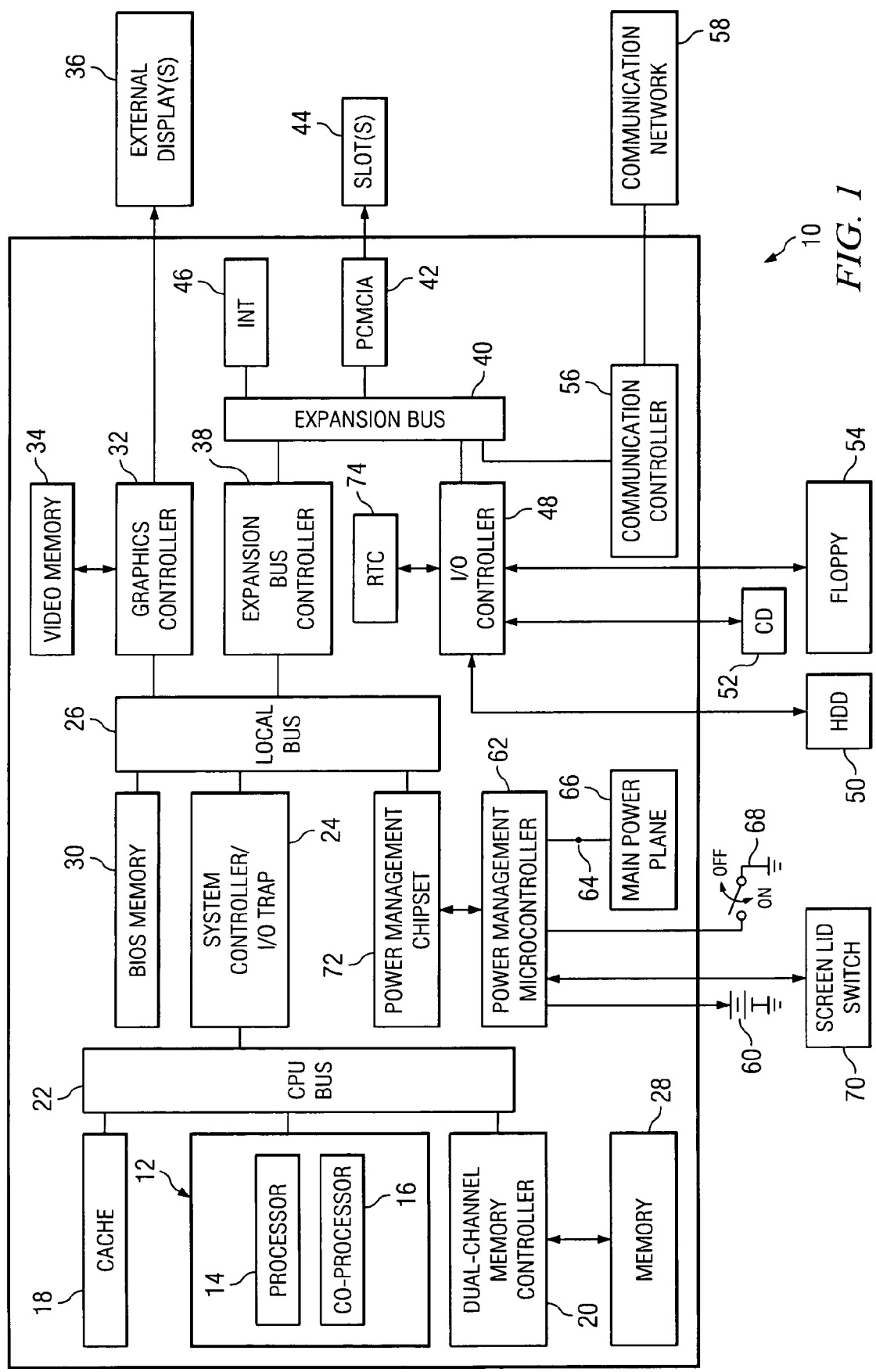
FIG. 1 is a block diagram illustrating one embodiment of an information handling system according to teachings of the present disclosure.

Referring first to FIG. 1, a block diagram of an information handling system is shown, according to teachings of the present disclosure. Information handling system or computer system 10 preferably includes at least one microprocessor or central processing unit (CPU) 12. CPU 12 may include processor 14 for handling integer operations and coprocessor 16 for handling floating point operations. CPU 12 is preferably coupled to cache 18 and memory controller 20 via CPU bus 22. System controller I/O trap 24 preferably couples CPU bus 22 to local bus 26 and may be generally characterized as part of a system controller.

Main memory 28 of dynamic random access memory (DRAM) modules is preferably coupled to CPU bus 22 by a memory controller 20. In a preferred embodiment, main memory 28 and memory controller 20 are two components or devices of a dual-channel memory system. In one embodiment, memory controller 20 may achieve dual-channel support through the employment of two independent memory controllers (not expressly shown). Memory controller 20 is also preferably compatible with DDR (double data rate) main memory 28, memory capable of transferring data on both the rising and falling edges of each clock cycle. Main memory 28 may include a plurality of memory media, such as memory cards, memory sticks, etc.

Basic input/output system (BIOS) memory 30 is also preferably coupled to local bus 26. FLASH memory or other nonvolatile memory may be used as BIOS memory 30. A BIOS program (not expressly shown) is typically stored in BIOS memory 30. The BIOS program preferably includes software which facilitates interaction with and between the devices of information handling system 10 and such devices as a keyboard (not expressly shown), a mouse (not expressly shown), or one or more I/O devices. BIOS memory 30 may also store system code (note expressly shown) operable to control a plurality of basic information handling system 10 operations. Additional detail of preferred BIOS capabilities will be discussed below with reference to FIGS. 3 through 5.

Graphics controller 32 is preferably coupled to local bus 26 and to video memory 34. Video memory 34 is preferably operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Bus interface controller or expansion bus controller 38 preferably couples local bus 26 to expansion bus 40. In one embodiment, expansion bus 40 may be configured as an Industry Standard Architecture ("ISA") bus. Other buses, for example, a Peripheral Component Interconnect ("PCI") bus, may also be used. One or more devices may be coupled to expansion bus 40 via one or more expansion card slots (not expressly shown).

In a portable information handling system embodiment, Personal Computer Memory Card International Association (PCMCIA) controller 42 may also be included and is preferably coupled to expansion bus 40 as shown. PCMCIA controller 42 is preferably coupled to a plurality of information handling system expansion slots 44. Expansion slots 44 may be configured to receive one or more PCMCIA expansion cards such as modems, fax cards, communications cards, and other input/output (I/O) devices.

Interrupt request generator 46 is also preferably coupled to expansion bus 40. Interrupt request generator 46 is preferably operable to issue an interrupt service request over a predetermined interrupt request line in response to receipt of a request to issue interrupt instruction from CPU 12.

I/O controller 48 is also preferably coupled to expansion bus 40. I/O controller 48 preferably interfaces to an integrated drive electronics (IDE) hard drive device (HDD) 50, CD-ROM (compact disk-read only memory) drive 52 and/or a floppy disk drive (FDD) 54. Other disk drive devices (not expressly shown) which may be interfaced to the I/O controller include a removable hard drive, a zip drive, a CD-RW (compact disk-read/write) drive, and a CD-DVD (compact disk—digital versatile disk) drive.

Communication controller 56 is preferably provided and enables information handling system 10 to communicate with communication network 58, e.g., an Ethernet network. Communication network 58 may include a local area network (LAN), wide area network (WAN), Internet, Intranet, wireless broadband or the like. Communication controller 56 may be employed to form a network interface for communicating with other information handling systems (not expressly shown) coupled to communication network 58.

As illustrated, information handling system 10 preferably includes power supply 60, which provides power to the many components and/or devices that form information handling system 10. Power supply 60 may be a rechargeable battery, such as a nickel metal hydride ("NiMH") or lithium ion battery, when information handling system 10 is embodied as a portable or notebook computer, an A/C (alternating current) power source, an uninterruptible power supply (UPS) or other power source.

Power supply 60 is preferably coupled to power management microcontroller 62. Power management microcontroller 62 preferably controls the distribution of power from power supply 60. More specifically, power management microcontroller 62 preferably includes power output 64 coupled to main power plane 66 which may supply power to CPU 12 as well as other information handling system components. Power management microcontroller 62 may also be coupled to a power plane (not expressly shown) operable to supply power to an integrated panel display (not expressly shown), as well as to additional power delivery planes preferably included in information handling system 10.

Power management microcontroller 62 preferably monitors a charge level of an attached battery or UPS to determine when and when not to charge the battery or UPS. Power management microcontroller 62 is preferably also coupled to main power switch 68, which the user may actuate to turn information handling system 10 on and off. While power management microcontroller 62 powers down one or more portions or components of information handling system 10, e.g., CPU 12, display 36, or HDD 50, etc., when not in use to conserve power, power management microcontroller 62 itself is preferably substantially always coupled to a source of power, preferably power supply 60.

In a portable embodiment, information handling system 10 may also include screen lid switch or indicator 70 which provides an indication of when an integrated display is in an open position and an indication of when the integrated display is in a closed position. It is noted that an integrated panel display may be located in the same location in a lid (not expressly shown) of the computer as is typical for clamshell configurations of portable computers such as laptop or notebook computers. In this manner, the integrated display may form an integral part of the lid of the system, which swings from an open position to permit user interaction to a closed position.

Computer system 10 may also include power management chip set 72. Power management chip set 72 is preferably coupled to CPU 12 via local bus 26 so that power management chip set 72 may receive power management and control commands from CPU 12. Power management chip set 72 is preferably connected to a plurality of individual power planes operable to supply power to respective components of information handling system 10, e.g., HDD 50, FDD 54, etc. In this manner, power management chip set 72 preferably acts under the direction of CPU 12 to control the power supplied to the various power planes and components of a system.

Real-time clock (RTC) 74 may also be coupled to I/O controller 48 and power management chip set 72. Inclusion of RTC 74 permits timed events or alarms to be transmitted to power management chip set 72. Real-time clock 74 may be programmed to generate an alarm signal at a predetermined time as well as to perform other operations.

Figure 2:
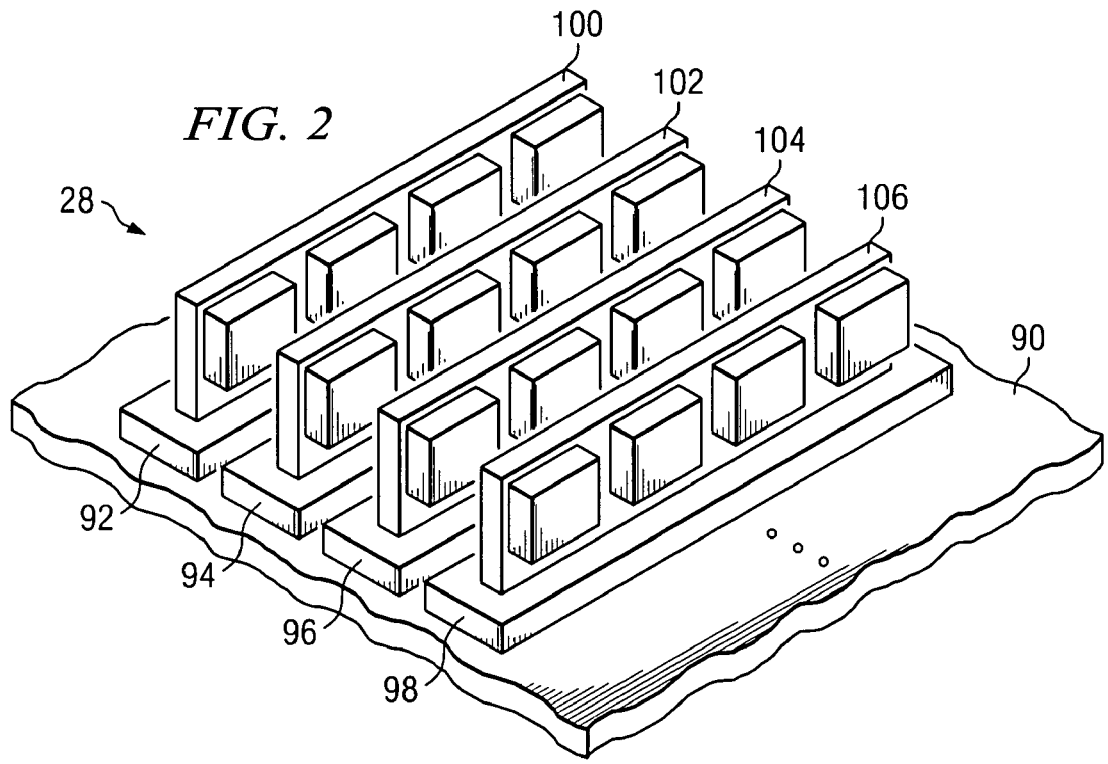
FIG. 2 is a perspective view with portions cut away of one embodiment of components in a memory system of an information handling system according to teachings of the present disclosure.

Referring now to FIG. 2, a view of one embodiment of system or main memory 28 of FIG. 1 is shown. As mentioned above, system or main memory 28 is preferably implemented as dual-channel DDR memory. In general, implementation of dual-channel DDR memory systems necessitates the use of a dual-channel memory controller with DDR capable memory devices.

Memory controller 20, the interface between the CPU and system memory, is typically included on the northbridge portion of the motherboard chip set. Besides handling data flow to and from the processor, memory controller 20 preferably also governs information handling system 10 memory system support for different types and speeds of memory, along with the maximum memory module size and installable memory ceiling.

The standard configuration for most of today's information handling systems is a single channel architecture. In addition to providing high availability, single channel architectures generally have the advantage of low cost and excellent memory compatibility and flexibility. However, a single channel memory controller typically becomes a performance bottleneck when it cannot keep up with the CPU and CPU bus, leaving the processor to waste clock cycles with nothing to process.

To cure the performance bottleneck typically experienced with single channel memory architectures, information handling system manufacturers have been quick to embrace the benefits of dual-channel memory architectures. The basic concept of dual-channel memory architectures is adding a second memory channel to theoretically double the bandwidth of the memory system. In one aspect, the dual-channel memory architecture concept turns older, slower, and cheaper memory into an up-to-date architecture by adding a second, parallel memory pathway. Instead of having to ratchet up memory clock speeds and creating timing instability issues, dual-channel controllers simply take what is widely available and double it.

Many implementations of dual-channel memory architectures include two independent memory controllers. In operation, both memory controllers typically operate concurrently with one another and thereby hide latencies associated with conventional chip sets. For example, controller "A" may read or write to main memory while controller "B" prepares for the next access, and vice versa. By combining dual-channel memory architectures with DDR memory, DDR memory referring to that memory which transfers data on both the rising and falling edges of each clock cycle, main memory 28 and memory controller 20 of information handling system 10 typically increases performance significantly over single channel architectures and non DDR dual-channel memory architectures.

As shown in FIG. 2, main memory 28 is preferably mounted to system board or motherboard 90 via slots 92, 94, 96 and 98. Preferably disposed in slots 92, 94, 96 and 98 are DIMMs 100, 102, 104 and 106, respectively. DIMMs 100, 102, 104 and 106 are preferably DDR enabled memory modules. In addition, memory slots 92, 94, 96 and 98 are preferably operably coupled to dual-channel DDR memory controller 20 and processor 12, dual-channel memory controller 20 being operably coupled to processor 12 via CPU bus 22. While the present discussion refers to DIMMs, other memory device implementations are contemplated, e.g., single inline memory modules (SIMMs), memory sticks, etc.

According to teachings of the present disclosure, what is needed is a mechanism by which a user or software application may selectively enable and disable one or more devices of an information handling system memory system. In one aspect in particular, such a system may convey many benefits on users of information handling systems employing dual-channel DDR memory systems. Further, such capabilities may enable a user or software application to more efficiently determine defective or faulty memory system devices or components in a dual-channel memory system implementation without requiring the typical iterative process of adding and removing DIMMs into memory slots of the system in an attempt to isolate either a defective DIMM or a defective memory slot.

Figure 3:
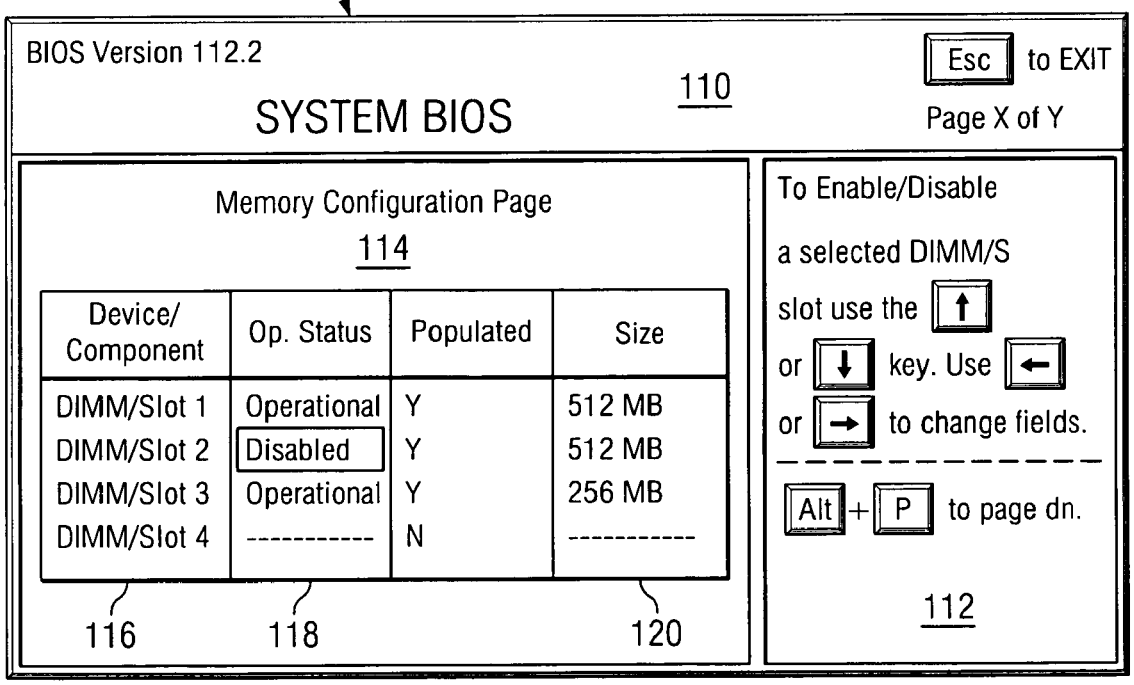
FIG. 3 is a block diagram depicting one embodiment of a BIOS interface screen display according to teachings of the present disclosure.

Referring now to FIG. 3, a block diagram depicting one embodiment of a BIOS interface incorporating teachings of the present disclosure is shown. As such, FIG. 3 generally illustrates an application interface through which a user or another application may selectively enable or disable one or more components of an information handling system memory system.

Illustrated generally at 108 in FIG. 3 is a screen shot or display of a portion of a BIOS utility whereby a user or diagnostic application may selectively control aspects of main memory 28 and/or memory controller 20 of information handing system 10. According to teachings of the present disclosure, the application responsible for generating display 108 is preferably also capable of interacting with processor 12, memory controller 20 and/or main memory 28 to enable one or more memory slots or DIMMs of main memory 28 to be selectively enabled, disabled or otherwise isolated. Such selective isolation preferably enables the user or an additional software application to identify one or more devices of main memory 28 which may be causing one or more memory errors on information handling system 10. Examples of memory errors which may prompt a user or additional software application to interrogate or otherwise query the memory system of information handling system 10 as to the operability of one or more memory devices included therein include, but are not limited to, failure of a memory diagnostic routine, the "blue screen" associated with Windows® based operating systems, as well as others.

In the embodiment of display or screen shot 108 depicted in FIG. 3, utility information section 110, help or instruction section 112 and memory system device or component information and configuration section 114 are preferably included. Preferably included in memory system utility information section 110 are such information as a memory system utility version number, directory information such as a page number, exit or escape information, as well as other information. Preferably included in help or instruction section 112 are one or more instructions on the use of one or more components of the memory system configuration components in a BIOS utility incorporating teachings of the present disclosure.

Memory system device or component information and configuration section 114 of display 108 preferably communicates a number of items pertaining to one or more aspects of the memory system of information handling system 10. In a first respect, memory system device or component information and configuration section 114 preferably includes one or more memory system device or component representations 116. For example, memory system or device component representation section 116 may include one or more representations for each DIMM or memory module of main memory 28 on information handling system 10, one or more representations for each memory slot included in the memory system of information handling system 10, a combination of the DIMMs and memory slots available on information handling system 10, as well as other information.

In addition to memory system device or component representation section 116, display 108 preferably includes memory system device or component operating status section 118 in memory system device or component information and configuration section 114. Preferably included in memory system device or component operating status section 118 is an indication of the operating state of an associated memory system device or component. For example, in an embodiment of information handling system 10 including three DIMMs disposed in three respective memory slots, memory system device or component operating status section 118 will preferably reflect whether each of the DIMMs and/or memory slots containing a corresponding DIMM is currently disabled, enabled or in some alternative operating state. In addition to displaying an operating status corresponding to the operating state of a respective DIMM or memory slot, memory system device or component operating status section 118 may serve as an interface enabling the user to selectively alter the operating status of a selected DIMM or memory slot. As shown in display 108, for example, a user may select memory slot two (2) or the DIMM disposed in memory slot two (2) to be disabled. As indicated in information or help section 112, one means for altering the operating state of a selected memory system device or component may be through the use of up or down cursor keys on a keyboard associated with information handling system 10. Additional detail regarding selective enabling and disabling or otherwise altering a memory system DIMM or memory slot will be discussed in greater detail below with respect to FIGS. 4 and 5.

In addition to those sections mentioned above, display 108 may be adapted to convey additional information to a user or an additional software utility. For example, memory system device or component information section 114 may convey to a user whether each of the memory slots included on information handling system 10 is currently populated with a memory module such as a DIMM, SIMM, etc. In a further embodiment, memory system device or component information and configuration section 114 may also convey one or more characteristics of a selected memory slot or a memory component disposed in a corresponding memory slot such as a memory device size or capacity, as indicated at 120 in FIG. 3. Additional or alternative information may also be conveyed in display 108 without departing from the spirit and scope of teachings of the present disclosure.

Figure 4:
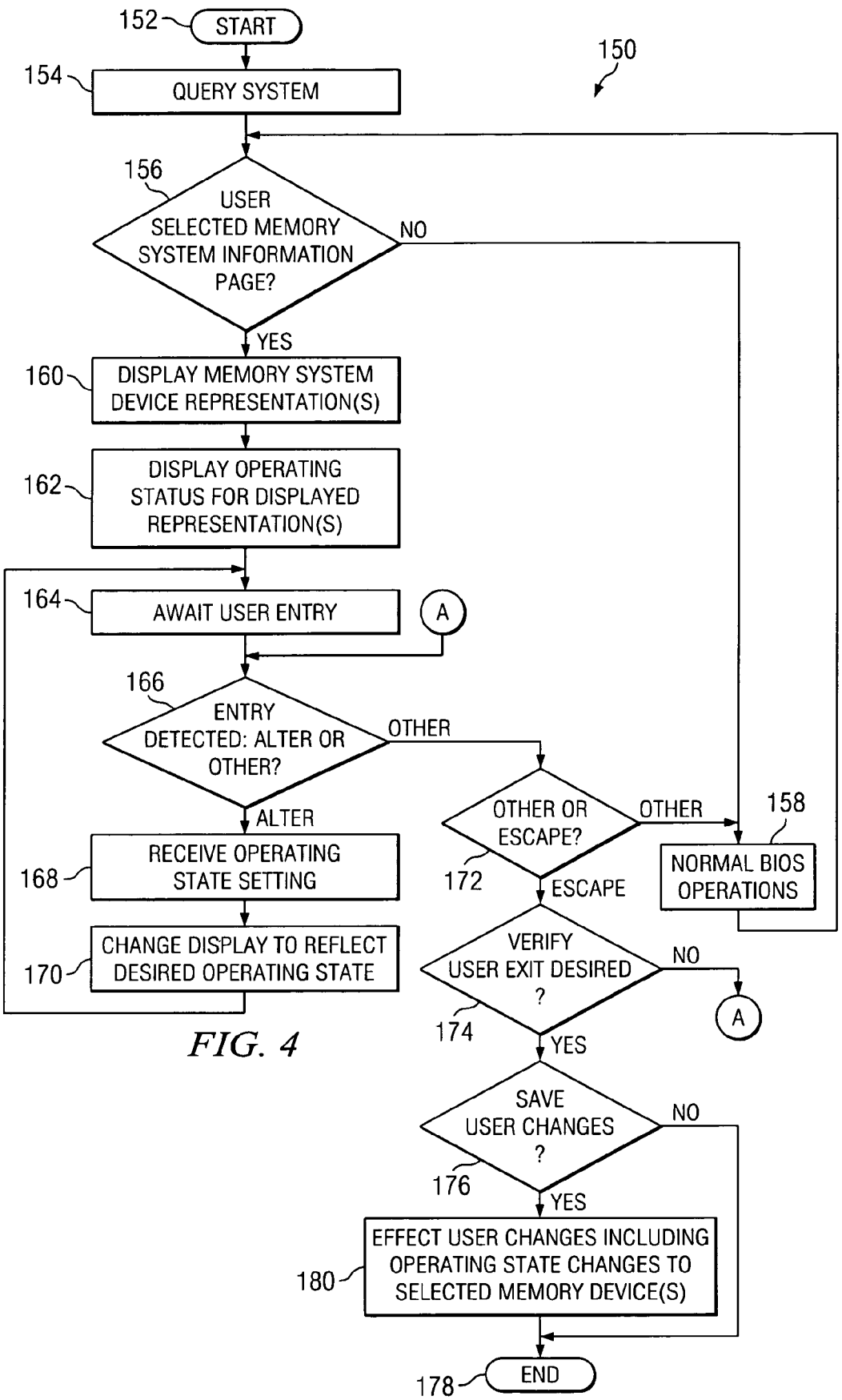
FIG. 4 is a flow diagram depicting one embodiment of a method of operation of a BIOS according to teachings of the present disclosure.

Referring now to FIG. 4, one method of operation for a BIOS incorporating teachings of the present disclosure is shown. In an alternate embodiment, method 150 of FIG. 4 preferably enables a user to view and alter the operating state of one or more devices of an information handling system memory system.

Upon beginning at 152, method 150 preferably proceeds to 154 where the BIOS, within which method 150 may be implemented, preferably queries information handling system 10 to identify one or more components thereof. With particular respect to method 150, information handling system 10 is preferably queried at 154 to identify the one or more memory devices or components making up the memory system preferably included on information handling system 10. Also, at 154, the operating status of the one or more memory devices or components of the memory system of information handling system 10 may be determined. Further, additional aspects, characteristics or traits of the one or more devices or components included in the memory system of information handling system 10 may be determined at 154, e.g., memory card capacity, memory slot population, address ranges for the respective memory slots and memory cards.

On completion of the system query at 154, method 150 preferably proceeds to 156. At 156, user interaction with the BIOS is preferably monitored to identify user selection of the memory system device or component information and configuration page included therein. If at 156 it is determined that the user is not currently leveraging capabilities incorporated in the BIOS regarding enabling and disabling one or more memory system devices or components, method 150 preferably proceeds to 158 where other BIOS operations may be performed. Alternatively, if at 156 it is determined that the user has selected memory system device and component information and configuration capabilities included in the BIOS, method 150 preferably proceeds to 160.

At 160, method 150 preferably enables display to the user, one or more memory system device or component representations. For example, display or screen shot 108 of FIG. 3. In addition to displaying one or more memory system device representations at 160, method 150 preferably also provides for the display of an operating status for each of the displayed memory system device or component representations at 162, the operating status generally corresponding to a current operating state for a respective memory system device or component. For example, operating status region 118 of screen shot or display 108 generally illustrated in FIG. 3. Once at least one memory system device or component representation has been displayed at 160 and the operating status of the at least one memory system device representation has been displayed at 162, method 150 preferably proceeds to 164 where a user entry may be awaited.

Upon detection of a user entry, the user entry is preferably analyzed to determine whether the entry concerns alteration of one or more characteristics of a memory system device or component displayed or the user entry concerns other BIOS operations at 166. If it is determined that the detected user entry concerns alteration of one or more characteristics of a memory system device or component, method 150 preferably proceeds to 168. At 168, a user desired operating state setting is preferably received by method 150 before proceeding to 170. The displayed operating status for the selected memory system device or component is preferably changed at 170, to reflect the user desired operating state for the selected memory system device or component. Upon effecting the change of display at 170, method 150 preferably returns to 164 to await additional user entries.

If at 166 it is determined that the detected user entry concerns other BIOS operations, method 150 preferably proceeds to 172. At 172, the detected user entry is preferably evaluated to determine whether it is an escape or exit operation or whether it is an additional BIOS operation. If at 172 it is determined that the detected user entry is an additional BIOS operation, method 150 preferably proceeds to 158 where other BIOS operations may be performed before returning to 156. Alternatively, if at 172 it is determined that the user entry is an escape or exit entry, method 150 preferably proceeds to 174.

At 174, the user may be prompted to verify their desire to escape or exit the BIOS utility or, alternatively, to verify their desire to escape or exit the memory system component or device configuration and alteration capabilities of the BIOS. If at 174 the user indicates that they in fact do not desire to exit the BIOS utility or the memory system device or component alteration capabilities of the BIOS utility, method 150 preferably returns to 166. Alternatively, if at 174 the user verifies their desire to exit or escape from the BIOS utility or the memory system device component configuration and alteration capabilities of the BIOS utility, method 150 preferably proceeds to 176 where the user may be prompted as to their desire to save any changes made during the current BIOS utility session.

If at 176 the user responds with a desire not to save changes selected during the current BIOS utility session, method 150 preferably ends at 178. Alternatively, if at 176 the user responds with a desire that the selected changes designated during the current BIOS utility session be saved and implemented, method 150 preferably proceeds to 180 where the selected changes are preferably effected by one or more BIOS operations, including effecting those changes to the operating state of the one or more selected memory devices or components. Method 150 then preferably ends at 178.

Following exit from the BIOS utility in method 150 at 178, the information handling system may be operated in a variety of manners including, but not limited to, booting the system to an operating system or running one or more diagnostics routines. Various alterations, changes or substitutions may be made with respect to method 150 without departing from the spirit and scope of teachings of the present disclosure.

Figure 5:
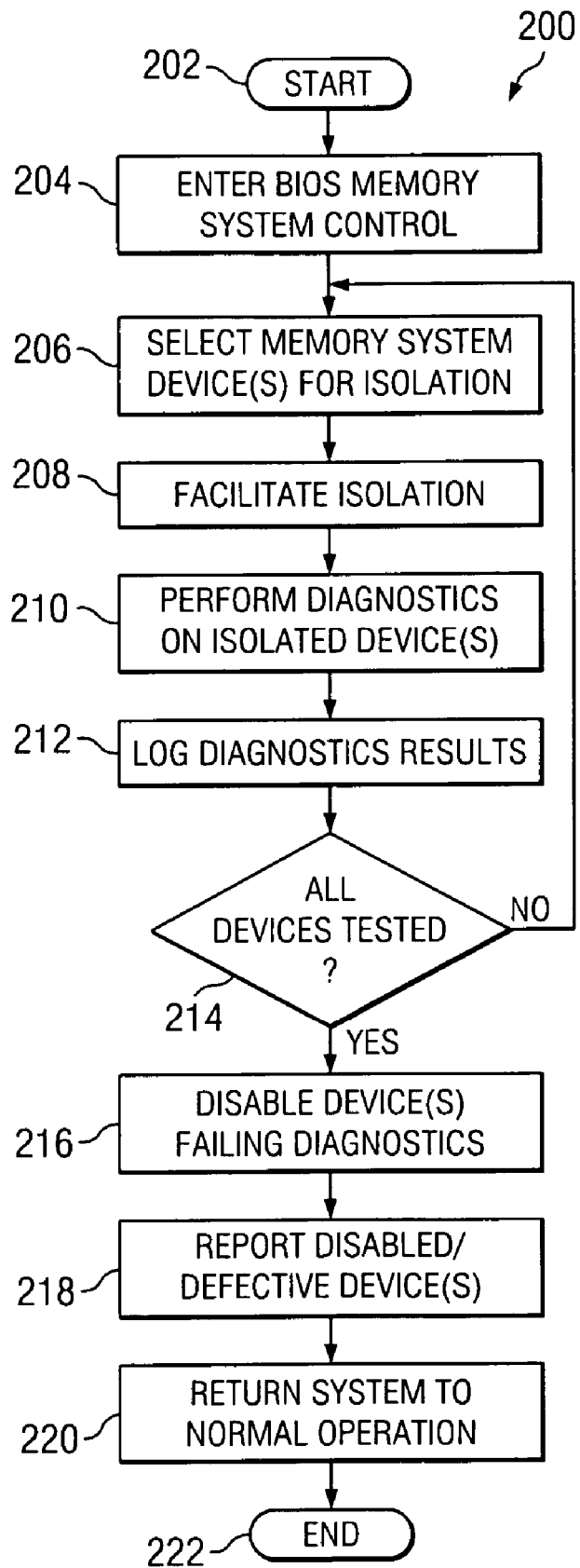
FIG. 5 is a flow diagram depicting one embodiment of a diagnostic routine for identifying one or more defective memory system devices according to teachings of the present disclosure.

Referring now to FIG. 5, one embodiment of a diagnostic method for identifying faulty or defective memory devices or components suspected of causing memory system errors, incorporating teachings of the present disclosure is shown. Method 200 of FIG. 5 preferably includes the capability of selectively enabling and disabling memory system devices, in particular in dual-channel DDR memory system implementations, such that suspected faulty or defective memory system devices or components may be accurately diagnosed and subsequently repaired.

Upon initiation at 202, for example, in response to user initiation of an information handling system memory system diagnostics routine, method 200 preferably proceeds to 204 where BIOS level memory system control teachings of the present disclosure may be accessed. Upon entering the memory system control BIOS utility at 204, method 200 may utilize one or more methods to select one or more memory system devices or components for isolation and subsequent diagnostics testing. As discussed above, dual-channel DDR memory systems are generally difficult to diagnose. According to teachings of the present disclosure, temporarily reducing the complexity of such a memory system, such as by enabling only one device, the isolated device may be tested or diagnosed to determine its operational integrity.

Isolating one or more memory system components or devices, DIMMs or memory slots for example, may be effected using a variety of methodologies. In one embodiment, method 200 may cooperate with a BIOS level memory system control to identify those memory system devices or components currently enabled and available for diagnostic testing. In an alternate embodiment, a log of previously tested memory system devices or components may be accessed by method 200 and/or memory system information and configuration BIOS utility to identify those memory system devices or components still needing diagnostic testing. In still a further embodiment, method 200 may cooperate with a memory system control BIOS utility incorporating teachings of the present disclosure and perform diagnostic testing on each memory system device or component in sequential order, as presented by a BIOS included on information handling system 10.

Once one or more memory system devices or components have been selected for isolation and testing at 206, method 200 preferably proceeds to 208 where isolation of the selected memory system devices or components is preferably facilitated. In one embodiment facilitating isolation of one or more memory system devices or components may involve disabling the memory slot associated with a particular memory module desired to be subjected to diagnostic testing. In an alternative embodiment, an address range may be associated with each memory slot such that facilitating isolation of one or more memory system devices or components may involve disabling or masking an address range associated with the memory devices or components selected to be isolated. In still a further embodiment, one or more memory devices or components may be effectively isolated by first permitting an application incorporating teachings of the present disclosure may facilitate switching of the memory system from dual-channel to single channel. In one or more of the previously mentioned isolation methodologies, as well as in alternative isolation methodologies, additional hardware may be incorporated into information handling system 10 such that effective isolation of one or more memory system memory slots, memory cards or other memory system devices or components may be effected.

Following isolation of one or more selected memory system devices or components at 208, method 200 preferably proceeds to 210. At 210, one or more diagnostic tests are preferably performed on the one or more isolated memory system devices or components. According to teachings of the present disclosure, diagnostic testing may assume many forms, e.g., a dedicated memory diagnostics application, booting to an operating system and observing any errors, etc. In addition, diagnostics may be run within the BIOS application, external to the BIOS, as well as using other implementations.

Following diagnostic testing on the one or more isolated memory system devices or components at 210, method 200 preferably logs the results from the diagnostic tests at 212. For example, if DIMM A was tested and passed, a log entry indicating DIMM A successfully completed the diagnostic routine would preferably be made. Such a log may be maintained in a memory accessible by the BIOS, a diagnostic routine, an operating system, etc., and such that the log is not at risk for loss during an isolation routine.

At 214, method 200 preferably determined whether each memory system device or component to be subjected to diagnostic testing has been so subjected. For example, if a plurality of memory system devices or components were isolated at 206 and 208, method 200 may first ensure each member of the plurality has been subjected to desired testing prior to looking to any remaining memory system device or components. In such a case, if the isolated plurality passes diagnostic testing, isolation of the individual components may be skipped and those memory systems devices or components excluded from the plurality may be tested in accordance with method 200.

If at 214 it is determined that not all memory system devices or components have been desirably tested, method 200 preferably returns to 206 where the next memory system component or device may be selected for isolation. Alternatively, if at 214 it has been determined that all memory system devices or components have been desirably tested, method 200 preferably proceeds to 216.

At 216, those devices whose diagnostic test results indicate faulty or defective hardware are preferably disabled by the diagnostic routine incorporating teachings of the present disclosure. As mentioned above, teachings of the present disclosure suggest the software level capability of the present disclosure be incorporated in information handling system 10 which enables selective enabling and disabling of one or more memory system devices or components. As such, method 200, upon reviewing the log created at 212, for example, may identify those devices whose diagnostic test results indicate faulty or failing devices or components and subsequently cooperate with a BIOS level memory system device or component control to disable such faulty or defective memory system devices or components at 216. Preferably, teachings of the present disclosure provide for the maintaining of the disabled memory system devices or components throughout subsequent uses of information handling system 10, such as until the faulty or defective memory system device or component is repaired, replaced or passes additional diagnostic testing.

Following the disabling of the faulty or defective devices at 216, method 200 preferably proceeds to 218 where the one or more memory system devices or components identified as defective or faulty and subsequently disabled may be reported to the user. Reporting such devices to the user may include display of one or more memory system device or component representations indicating the memory slot or DIMM modules disabled as a result of their failing diagnostic testing.

Following reporting of the disabled and defective devices at 218, method 200 preferably proceeds to 220 where information handling system 10 may be returned to normal operations; e.g., rebooted to an operating system or a diagnostic routine, or other application without the services of the one or more disabled memory system devices or components. Method 200 then preferably ends at 222.

Although the disclosed embodiments have been described in detail, it should be understood that various changes, substitutions and alterations can be made to the embodiments without departing from their spirit and scope.

What is claimed is:

1. Software for diagnosing a memory system including a plurality of memory system devices, the software embodied in computer readable media and when executed operable to:
   provide an interface for user selection of at least one memory system device for isolation;
   facilitate isolation of the at least one selected memory system device by disabling all system memory devices except the at least one selected memory device or disabling the at least one selected memory device;
   perform at least one diagnostic test on a first one of the at least one isolated memory system device; and
   repeat the isolation and diagnostic test operations for at least a second memory system devices;

wherein the isolation and diagnostic test operations for the first and second memory system devices are performed during the same BIOS utility session.

2. The software of claim 1, further operable to log one or more results from the memory system device diagnostic test.

3. The software of claim 1, further operable to maintain isolation of each memory system device whose diagnostic test indicates faulty operation.

4. The software of claim 1, further operable to report each memory system device whose diagnostic test indicates faulty operation.

5. The software of claim 1, further operable to effect the facilitate and perform operations on at least one memory slot of the memory system.

6. The software of claim 1, further comprising performing at least one diagnostic test on each of the at least one isolated memory system device.

7. The software of claim 1, wherein the at least one isolated memory system device includes the second memory system device.

8. The software of claim 1, wherein the at least one isolated memory system device does not include the second memory system device.

9. Software for managing a memory system having a plurality of memory system devices, the software embodied in computer readable media and when executed operable to:
receive a user selection of an operating state for a first selected memory system device;
alter the operating state of the first selected memory system device in accordance with the user's operating state selection;
perform at least one diagnostic test on the first selected memory system device; and
repeat the user selection, operating state altering, and diagnostic operations for a second memory system device;
wherein the user selection, operating state altering, and diagnostic operations for the first and second memory system devices are performed during the same BIOS utility session.

10. The software of claim 9, further operable to communicate an operating state for each memory system device.

11. The software of claim 9, further operable to maintain the selected operating state through subsequent information handling system boot operations.

12. The software of claim 9, further operable to disable a memory card slot of the memory system, the memory card slot adapted to support a dual-channel memory card.

13. An information handling system, comprising:
a plurality of memory slots operable in at least one of a plurality of operating states;
at least one processor operably coupled to the memory slots; and
a program of instructions embodied in computer readable media and executable by the processor, the program of instructions operable to:
effect a user selected operating state for a first one of the plurality of memory slots during a particular BIOS utility session;
allow a user to selectively toggle the operating state for the first memory slot between enabled and disabled during the particular BIOS utility session;
initiate a diagnostic routine to test the first memory slot during the particular BIOS utility session; and
repeat the diagnostic routine for a second one of the plurality of memory slots during the particular BIOS utility session.

14. The information handling system of claim 13, further comprising the program of instructions operable to:
display a memory slot representation corresponding to a respective one of the plurality of memory slots; and
communicate an operating status for each displayed memory slot representation, the operating status corresponding to an operating state for each respective memory slot.

15. The information handling system of claim 13, further comprising:
a basic input/output system memory operably coupled to the processor;
a basic input/output system program stored in the basic input/output system memory; and
the program of instructions incorporated in the basic input/output system program.

16. The information handling system of claim 13, further comprising the program of instructions operable to maintain the selected operating state of the memory devices through additional information handling system operations.

17. The information handling system of claim 13, further comprising the program of instructions operable to prevent communication with a memory module disposed in a memory slot in the disabled operating state.

18. A method for identifying faulty devices in a memory system including a plurality of memory slots and a plurality of memory modules disposed in at least a portion of the plurality of memory slots and wherein the memory slots are controllable from a basic input-output system (BIOS) utility, comprising:
receiving from a user a selection of one or more memory modules for isolation;
isolating, via a BIOS utility setting, the one or more memory modules selected by the user;
disabling any remaining memory modules via the BIOS utility setting;
performing at least one diagnostic test on at least a first one of the one or more isolated memory modules, the diagnostic test operable to produce at least one result; and
repeating the isolating, disabling, and diagnostic operations for at least a second memory module;
wherein the isolation and diagnostic test operations for the first and second memory modules are performed during the same BIOS utility session.

19. The method of claim 18, further comprising performing diagnostic testing on a memory module associated with the isolated memory system device.

20. The method of claim 18, further comprising performing diagnostic testing on the memory slot associated with the isolated memory system device.

21. The method of claim 18, further comprising reporting any memory system devices whose diagnostic test results indicate faulty operation.

22. The method of claim 18, further comprising maintaining, via BIOS utility settings, disability of those memory system devices whose diagnostic test results indicate faulty operation.

23. The method of claim 18, further comprising:
logging the results for the diagnostic test performed on each isolated memory system device; and
reporting to a user those memory system devices whose logged results indicate faulty operation upon completing diagnostic testing.

* * * * *